(12) United States Patent
Kim et al.

(10) Patent No.: US 12,721,763 B2
(45) Date of Patent: Sep. 1, 2026

(54) APPARATUS AND METHOD FOR GUIDING THE TRANSPORTATION VULNERABLE

(71) Applicant: HYUNDAI MOBIS CO., LTD., Seoul (KR)

(72) Inventors: Seung Jae Kim, Hwaseong-si (KR); Hyun Jun Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 113 days.

(21) Appl. No.: 18/382,660

(22) Filed: Oct. 23, 2023

(65) Prior Publication Data

US 2024/0173179 A1 May 30, 2024

(30) Foreign Application Priority Data

Nov. 30, 2022 (KR) ........................ 10-2022-0165055
Nov. 30, 2022 (KR) ........................ 10-2022-0165056

(51) Int. Cl.
*A61G 3/00* (2006.01)
*B60N 3/02* (2006.01)
*G09B 21/00* (2006.01)

(52) U.S. Cl.
CPC ............... *A61G 3/00* (2013.01); *B60N 3/023* (2013.01); *G09B 21/003* (2013.01)

(58) Field of Classification Search
CPC .................... B60W 60/00253; B60W 2552/45
See application file for complete search history.

(56) References Cited

U.S. PATENT DOCUMENTS

2019/0038482 A1* 2/2019 Kline ..................... A61G 3/062
2020/0410406 A1* 12/2020 Leary ................. G01C 21/3423
2022/0164911 A1* 5/2022 Stumpf ................. H04W 4/024
2022/0221867 A1* 7/2022 Taveira .................. G05D 1/617
2022/0327651 A1* 10/2022 Trim ...................... G06Q 50/40
2023/0226963 A1* 7/2023 Paradis .................. B60N 3/023 296/1.02
2023/0251101 A1* 8/2023 Masuda ............ G01C 21/3415 701/411
2023/0415764 A1* 12/2023 Cserna ................... B60Q 1/507
2024/0369369 A1* 11/2024 Yew ..................... G06V 10/809

* cited by examiner

*Primary Examiner* — Thomas E Worden
*Assistant Examiner* — Alexandra R. Morford
(74) *Attorney, Agent, or Firm* — Morgan Lewis & Bockius LLP

(57) ABSTRACT

A method of guiding a transportation vulnerable person includes, in response to a vehicle entering a destination, monitoring surroundings of the destination, determining a drop-off point at the destination based on information from the monitoring, and controlling a guide handle to move to an outside of the vehicle when the transportation vulnerable person alights at the determined drop-off point.

9 Claims, 15 Drawing Sheets

Figure 2:
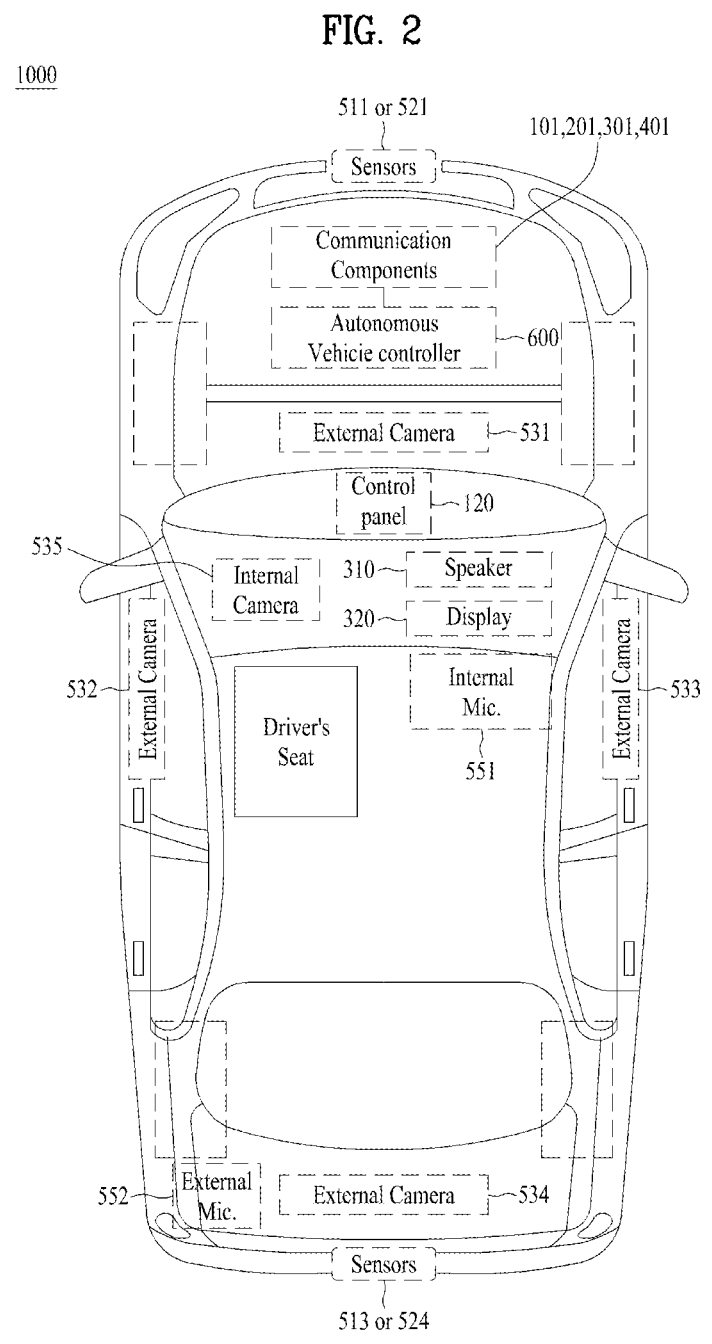

511 or 521
Sensors
101,201,301,401
Communication Components
Autonomous Vehicle controller
600
External Camera
531
Control panel
120
535
Internal Camera
310
Speaker
320
Display
532
External Camera
External Camera
533
Driver's Seat
Internal Mic.
551
552
External Mic.
External Camera
534
Sensors
513 or 524

APPARATUS AND METHOD FOR GUIDING THE TRANSPORTATION VULNERABLE

Pursuant to 35 U.S.C. § 119(a), this application claims the benefit of earlier filing dates and right of priority to Korean Application No. 10-2022-0165055 and 10-2022-0165056, filed on Nov. 30, 2022, the contents of which are hereby incorporated by reference in their entirety.

BACKGROUND OF THE DISCLOSURE

Field of the Disclosure

Embodiments are applicable to autonomous vehicles in any field, and more particularly, to, for example, a system of vehicles for transportation of transportation vulnerable persons, particularly the visually impaired.

Discussion of the Related Art

Society of Automotive Engineers (SAE), an American automotive engineering society, subdivides autonomous driving levels into a total of six steps, for example, from level 0 to level 5, as follows.

Level 0 (No Automation) is a step in which a driver controls and is responsible for everything in driving. The driver always drives, and a system of an autonomous vehicle performs only auxiliary functions such as emergency notification, etc. At this level, a subject of driving control is human and variable detection and driving responsibility during driving are held by the human.

Level 1 (Driver Assistance) is a step of assisting a driver through adaptive cruise control and lane keeping functions. By activating a system, a driver is assisted by maintaining a speed of an autonomous vehicle, a vehicle-to-vehicle distance, and lanes. At this level, driving control subjects are a human and a system, and both the detection of variables that occur during driving and the driving responsibility are held by the humans.

Level 2 (Partial Automation) is a step in which an autonomous vehicle and a human can control steering and acceleration/deceleration of the autonomous vehicle for a certain period of time within a specific condition. Auxiliary functions such as steering at a gentle curve and maintaining a distance from a car in front are available. However, at this level, the detection of variables during driving and the driving responsibility are held by the human, the driver should always monitor a driving situation, and the driver should intervene immediately in a situation where the system is not aware of it.

Level 3 (Conditional Automation) is the level at which a system is in charge of driving in certain sections of conditions, such as highways, and at which a driver intervenes only in case of danger. The system is in charge of driving control and variable detection during driving, and unlike Level 2, the monitoring is not required. However, if it exceeds the requirements of the system, the system requests the immediate intervention of the driver.

Level 4 (High Automation) is capable of autonomous driving on most roads. Both driving control and driving responsibility are held by a system. Driver intervention is unnecessary on most roads except for restricted situations. However, since driver intervention may be requested under certain conditions such as bad weather, a driving control device through humans is necessary for this level.

Level 5 (Full Automation) is a step of enabling a driving by an occupant only without a driver. The occupant enters only a destination and a system is responsible for driving under all conditions. At Level 5, control devices for steering, acceleration, and deceleration of an autonomous vehicle are unnecessary.

However, there is a need for a transportation vulnerable guidance apparatus to guide the transportation vulnerable, particularly the visually impaired, to specific places such as a braille block, a sidewalk, a safe location free of obstacles, or a destination for the visually impaired to ensure that the transportation vulnerable can move safely after getting out of a vehicle.

SUMMARY OF THE DISCLOSURE

To address the problems described above, one embodiment of the present disclosure provides a transportation vulnerable guidance apparatus that, when a visually impaired person in a vehicle alights at a specific place, identifies nearby obstacles and even a braille block and guides the person to the vicinity of the braille block.

The objects of the present disclosure are not limited to the above-mentioned technical objects, and other technical objects not mentioned above will become apparent to one of ordinary skill in the art from the following description.

A method of guiding a transportation vulnerable person one of the embodiments of the present disclosure to address the problems described above may include a vehicle entering a destination and monitoring surroundings of the destination, determining a drop-off point at the destination based on information from the monitoring, and controlling a guide handle to move to an outside of the vehicle when the transportation vulnerable person alights at the determined drop-off point.

In one embodiment, the vehicle entering the destination and monitoring the surroundings of the destination may include, when the destination is a structured destination, collecting information about at least one of busyness at the destination or braille block location information.

In one embodiment, the determining of the drop-off point at the destination based on the information from the monitoring may include determining whether an obstacle is present in the middle of a braille block at the destination, and when the obstacle is not present, determining that the vehicle stops at the drop-off point.

In one embodiment, the controlling of the guide handle to move to the outside of the vehicle when the transportation vulnerable person alights at the determined drop-off point may include identifying a location of a braille block at the drop-off point, and controlling the guide handle to move to the outside of the vehicle at the identified location of the braille block.

In one embodiment, the vehicle entering the destination and monitoring the surroundings of the destination may include, when the destination is an unstructured destination, collecting information about at least one of busyness at an expected arrival point, a business name, or a door location.

In one embodiment, the determining of the drop-off point at the destination based on the information from the monitoring may include determining whether the destination has a braille block as an unstructured destination.

In one embodiment, the method may further include, when the destination has the braille block, determining whether a distance between the braille block and the drop-off point is within a predetermined distance.

In one embodiment, the controlling of the guide handle to move to the outside of the vehicle when the transportation vulnerable person alights at the determined drop-off point may include, when the distance between the braille block and the drop-off point is within the predetermined distance, identifying a location of the braille block at the drop-off point, and controlling the guide handle to move to the outside of the vehicle toward the identified location of the braille block.

In one embodiment, the controlling of the guide handle to move to the outside of the vehicle when the transportation vulnerable person alights at the determined drop-off point further may include, when the distance between the braille block and the drop-off point is not within the predetermined distance, disregarding the braille block at the drop-off point, and controlling the guide handle to move to the outside of the vehicle toward the determined drop-off point.

A method for vehicle door handle guidance according to one of the embodiments of the present disclosure to address the problems described above may include, when a hand of a transportation vulnerable person approaches a vehicle door handle, determining a handle guidance step based on a distance between the vehicle door handle and the hand of the transportation vulnerable person, and providing a guidance notification based on the determined handle guidance step.

In one embodiment, the determining of the handle guidance step based on the distance between the vehicle door handle and the hand of the transportation vulnerable person may include, when the hand of the transportation vulnerable person approaches a vehicle exterior door handle, determining whether a distance between the vehicle exterior door handle and the hand of the transportation vulnerable person is within a first distance.

In one embodiment, the providing of the guidance notification based on the determined handle guidance step may include, when the distance between the vehicle exterior door handle and the hand of the transportation vulnerable person is within the first distance, providing up, down, left, or right directional information indicating a location of the handle through vibration.

In one embodiment, the method may further include, when the transportation vulnerable person grasps the handle after the directional information is provided through the vibration, discharging air with a direction and pattern through an air discharge part to indicate a direction in which a corresponding door opens.

In one embodiment, the method may include, when the transportation vulnerable person fails to find the handle after the directional information is provided through the vibration, determining whether the distance between the vehicle exterior door handle and the hand of the transportation vulnerable person is within a second distance.

In one embodiment, the determining of the handle guidance step based on the distance between the vehicle door handle and the hand of the transportation vulnerable person may include, when the distance between the vehicle exterior door handle and the hand of the transportation vulnerable person is within the second distance, providing an air flow through an air discharge part to indicate the location of the handle.

In one embodiment, the determining of the handle guidance step based on the distance between the vehicle door handle and the hand of the transportation vulnerable person may include, when the hand of the transportation vulnerable person approaches the vehicle exterior door handle, determining whether the distance between the vehicle exterior door handle and the hand of the transportation vulnerable person is within a third distance.

In one embodiment, the determining of the handle guidance step based on the distance between the vehicle door handle and the hand of the transportation vulnerable person may further include, when the distance between the vehicle exterior door handle and the hand of the transportation vulnerable person is within the third distance, providing an air flow through the air discharge part to indicate the handle.

In one embodiment, the providing of the guidance notification based on the determined handle induction step further may include, when the transportation vulnerable person grasps the handle after the directional information is provided through the air flow, discharging air with a direction and pattern through the air discharge part to indicate a direction in which a corresponding door opens.

According to one of the embodiments of the present disclosure, information that a vehicle can provide to the visually impaired may vary by distance, making it easier for the visually impaired to identify the called vehicle.

According to one of the embodiments of the present disclosure, when a vehicle arrives nearby, the vehicle may send a scent into the wind toward the visually impaired person, allowing the person to identify which direction the vehicle is arriving from and thus determine the location of a door to enter.

According to one of the embodiments of the present disclosure, transportation vulnerable individuals may be assisted to easily and safely locate vehicle door handles when entering and exiting a vehicle.

The effects obtainable from the present disclosure are not limited to those mentioned above, and other effects not mentioned will be apparent to one having ordinary skill in the art from the following description.

BRIEF DESCRIPTION OF THE DRAWINGS

FIG. 2 is a diagram illustrating an example in which an autonomous driving apparatus according to any one of embodiments of the present disclosure is applied to a vehicle.

DETAILED DESCRIPTION OF THE DISCLOSURE

Hereinafter, embodiments of the present disclosure will be described in detail with reference to the accompanying drawings so that those skilled in the art to which the present disclosure pertains may easily implement the present disclosure. However, the present disclosure may be implemented in various different forms and is not limited to the embodiments described herein. In addition, in order to clearly describe this disclosure in drawings, parts unrelated to the description are omitted and similar reference numbers are given to similar parts throughout the specification.

Throughout the specification, when a part "includes" a certain component, this means that it may further include other components, rather than excluding other components, unless otherwise stated.

Figure 1:
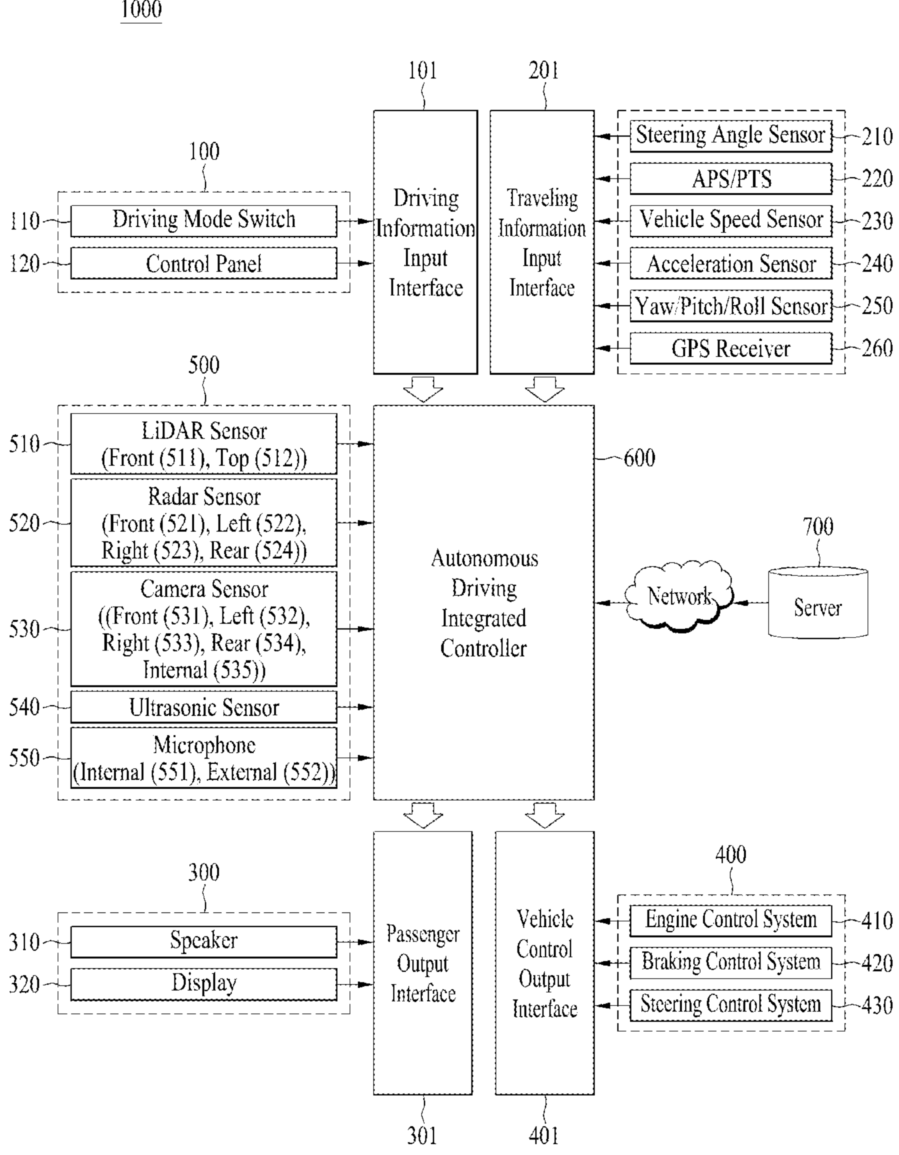
FIG. 1 is an overall block diagram of an autonomous driving control system to which an autonomous driving apparatus according to any one of embodiments of the present disclosure is applicable.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touchscreen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

Figure 3:
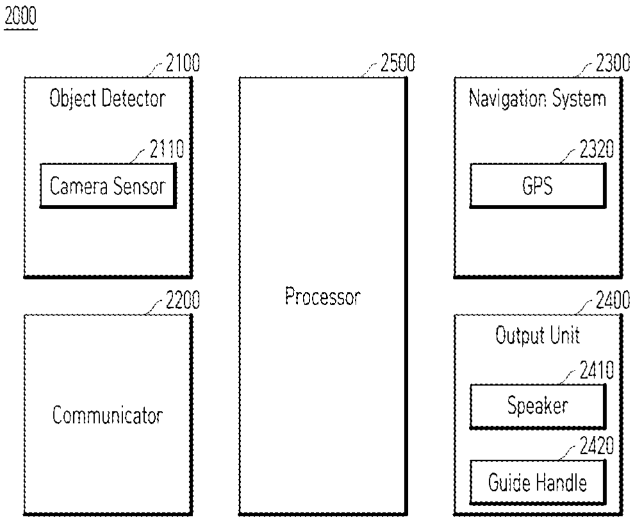
FIGS. 3 and 4 illustrate a transportation vulnerable guidance apparatus according to some embodiments of the present disclosure.
Figure 4:
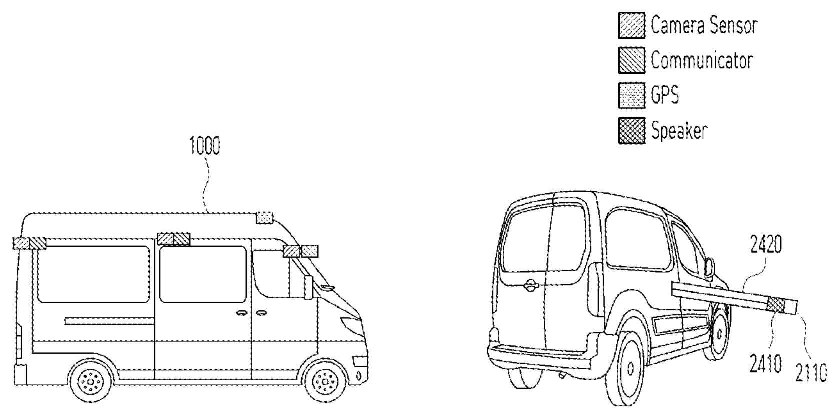

FIGS. 3 and 4 illustrate a transportation vulnerable guidance apparatus according to some embodiments of the present disclosure.

Referring to FIGS. 3 and 4, a transportation vulnerable guidance apparatus 2000 may include an object detector 2100, a communicator 2200, a navigation system 2300, an output unit 2400, and a processor 2500.

The object detector 2100 is configured to recognize objects around the vehicle 1000, and may include at least one of a camera sensor 2110, a radar sensor, and a LiDAR sensor. The object detector 2100 may detect a person who is about to alight from the vehicle.

The camera sensor 2110 may be installed on at least one of the front of the vehicle, the right side of the vehicle, or an end of a guide handle.

The camera sensor 2110 may capture images of the periphery of the vehicle 1000 to detect nearby objects outside of the vehicle 1000, and may detect nearby objects located within a predefined range of a set distance, a set vertical angle of view, and a set horizontal angle of view, according to the specifications thereof.

The camera sensor 2110 may include a front camera sensor, a left camera sensor, a right camera sensor, and a rear camera sensor installed on the front, left side, right side, and rear of the vehicle 1000, respectively, but the installation locations and number of installations are not limited to any particular embodiment. The processor 2500 of the vehicle 1000 may apply predefined image processing to the images captured by the camera sensors to determine, for example, the location of an object (including the distance to the object), the speed, and the direction of movement of the object. In addition, the processor 2500 of the vehicle 1000 may determine a braille block and an obstacle in the middle of the braille block based on the images captured through the camera sensors.

The radar sensor 2120 may be disposed on at least one of the front and right side of the vehicle. The radar sensor 2120 may be disposed around a location where the camera sensor 2110 is mounted.

By radiating electromagnetic waves around the vehicle 1000 and receiving signals that are reflected back from objects, the radar sensor 2120 may detect nearby objects outside the vehicle 1000, and may detect nearby objects located within a predefined range of a set distance, a set vertical angle of view, and a set horizontal angle of view according to the specifications thereof. The radar sensors 2120 may include a front radar sensor, a left radar sensor, a right radar sensor, and a rear radar sensor installed on the front, left side, right side, and rear of the vehicle 1000, respectively, but the installation locations and number of installations are not limited to any particular embodiment. The processor 2500 of the vehicle 1000 may determine the location (including distance to the object), speed, and direction of movement of an object by analyzing the power of electromagnetic waves transmitted and received by the radar sensor 2120. The processor 2500 of the vehicle 1000 may determine an obstacle in the middle of the braille block through the radar sensor 2120.

The LiDAR sensor 2130 may detect nearby objects outside the vehicle 1000 by transmitting laser signals around the vehicle 1000 and receiving signals reflected back from those objects, and may detect nearby objects located within a predefined range of a set distance, a set vertical field of view, and a set horizontal field of view according to the specifications thereof. The LiDAR sensor 2130 may include a front LiDAR sensor 2130, a top LiDAR sensor 2130, and a rear LiDAR sensor 2130 installed on the front, top, and rear of the vehicle 1000, respectively, but the installation locations and number of installations are not limited to any particular embodiment. A threshold for determining the validity of a laser signal reflected and returned from a corresponding object may be pre-stored in a memory (not shown) of the processor 2500 of the vehicle 1000, and the processor 2500 of the vehicle 1000 may determine the location (including distance to the corresponding object), speed, and direction of movement of the corresponding object by measuring the time that a laser signal transmitted by the LiDAR sensor 2130 is reflected and returned from the corresponding object.

In addition to the camera sensor 2110, radar sensor 2120, and LiDAR sensor 2130, the object detector 2100 may further include an ultrasonic sensor, and various other forms of sensors may be further employed in the object detector 2100 to detect objects around the vehicle 1000.

The object detector 2100 may perform target object classification (vehicle, pedestrian, bicycle, motorcycle) and detect target object information (relative distance, relative speed, object size) using the camera sensor 2100.

The communicator 2200 may include one or more transceivers, and may receive user data, control information, wireless signals/channels, etc. referred to in the functions, procedures, suggestions, methods, and/or flowcharts of operation disclosed herein from one or more other devices via the one or more transceivers. For example, the one or more transceivers may be connected to the processor 2500, and may transmit and/or receive wireless signals to and/or from the processor 2500. For example, at least one processor in the processor 2500 may control the one or more transceivers to transmit user data, control information, or wireless signals to at least one other device. Further, the at least one processor in the processor 2500 may control the one or more transceivers to receive user data, control information, or wireless signals from the at least one other device. Further, the one or more transceivers may be connected to one or more antennas, and the one or more transceivers may be configured to transmit and/or receive user data, control information, wireless signals/channels, etc. to and/or from other device(s) through the one or more antennas.

The navigation system 2300 may provide navigation information. The navigation information may include at least one of set destination information, route information according to the destination, map information related to the driving route, and current location information about the vehicle 1000. The navigation system 2300 may provide the processor 2500 with map information related to the driving route, such as curvature information about the road, the number of lanes on the road, the size of the lanes on the road, and a predicted route.

The navigation system 2300 may include a global positioning system (GPS) 2310, through which GPS coordinates of the vehicle 1000 may be obtained. The GPS 2310 may be disposed at the top of the windshield of the vehicle, where information can be received well. The processor 2500 of the vehicle 1000 may check the current location information and the busyness at the location through the navigation system 2300.

The output unit 2400 may include a speaker 2410 and a guide handle 2420 that provide guide notifications for surrounding information. The speaker 2410 and camera sensor 2110 may be disposed at the end of the guide handle.

The processor 2500 may monitor the surroundings of the destination as the vehicle enters the destination. When the destination is a structured destination, the processor 2500 may collect at least one of busyness at the expected arrival point or braille block location information. When the destination is an unstructured destination, the processor 2500 may collect at least one of busyness at the expected arrival point, business name, or door location.

The processor 2500 may determine a drop-off point at the destination based on the monitoring information. When the destination is a structured destination, the processor 2500 may determine whether there is an obstacle in the middle of a braille block at the destination. When there is no such obstacle, the processor 2500 may determine that the vehicle stops at the drop-off point. In this regard, the destination of the transportation vulnerable, particularly the visually impaired, may be defined as being within a radius of 1 to 2 meters from the drop-off point.

On the other hand, when the destination is an unstructured destination, the processor 2500 may determine whether there is a braille block at the destination. When the destination has a braille block, the processor 2500 may determine whether the distance between the braille block and the drop-off point is within a predetermined distance.

The processor 2500 may control the guide handle to move to an outside of the vehicle when the transportation vulnerable person alights at the determined drop-off point. Upon identifying a braille block location at the drop-off point, the processor 2500 may control the guide handle to move to the outside of the vehicle toward the identified braille block location.

When the distance between the braille block and the drop-off point is within a predetermined distance, the processor 2500 may identify the location of the braille block at the drop-off point, and control the guide handle to move to the outside of the vehicle toward the identified location of the braille block.

On the other hand, when the distance between the braille block and the drop-off point is not within the predetermined distance, the processor 2500 may disregard the braille block at the drop-off point and control the guide handle to move to the outside of the vehicle toward the determined drop-off point.

Figure 5:
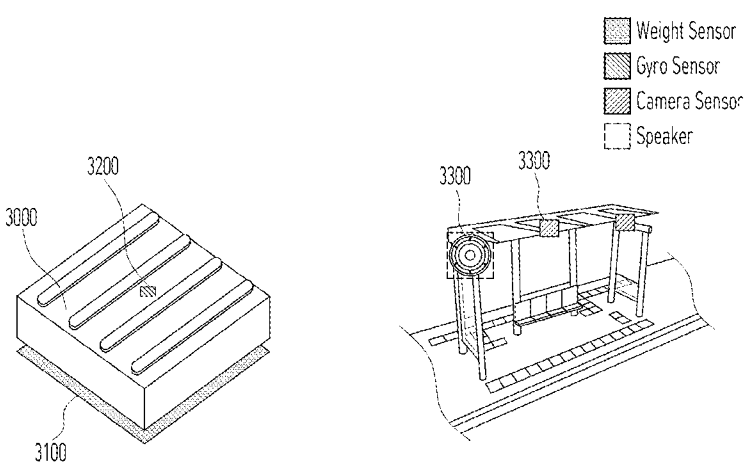
FIG. 5 illustrates a braille block system responsive to the transportation vulnerable according to some embodiments of the present disclosure.

FIG. 5 illustrates a braille block system responsive to the transportation vulnerable according to some embodiments of the present disclosure.

Referring to FIG. 5, a braille block system responsive to a transportation vulnerable person may include a weight sensor 3100, a gyro sensor 3200, a speaker 3300, a camera sensor 3400, and a communicator (not shown).

The weight sensor 3100 may be disposed at a bottom portion of the braille block. The weight sensor 3100 may detect physical weight applied to the braille block.

The gyro sensor 3200 may be disposed in a center portion of the braille block. The gyro sensor 3200 may detect physical tilt, when the braille block is tilted by a force applied thereto.

The speaker 3300 and camera 3400 may be placed at the periphery of the place where the braille block is installed. The speaker 3300 may provide announcements about information about the surroundings adjacent to the braille block. The camera 3400 may identify information about transportation vulnerable persons in proximity to the braille block.

Here, the transportation vulnerable persons may be persons who feel uncomfortable when using transportation or walking on the road. For example, the transportation vulnerable persons may include persons with physical disabilities, pregnant women, infants, children and adolescents, and the elderly. The persons with physical disabilities may include the visually impaired and the hearing impaired. The transportation vulnerable persons may further include, but are not limited to, stroller companions and wheelchair occupants.

When a physical signal is detected on the braille block, the communicator (not shown) may transmit auditory feedback to the visually impaired person through the speaker or earphones.

Figure 6:
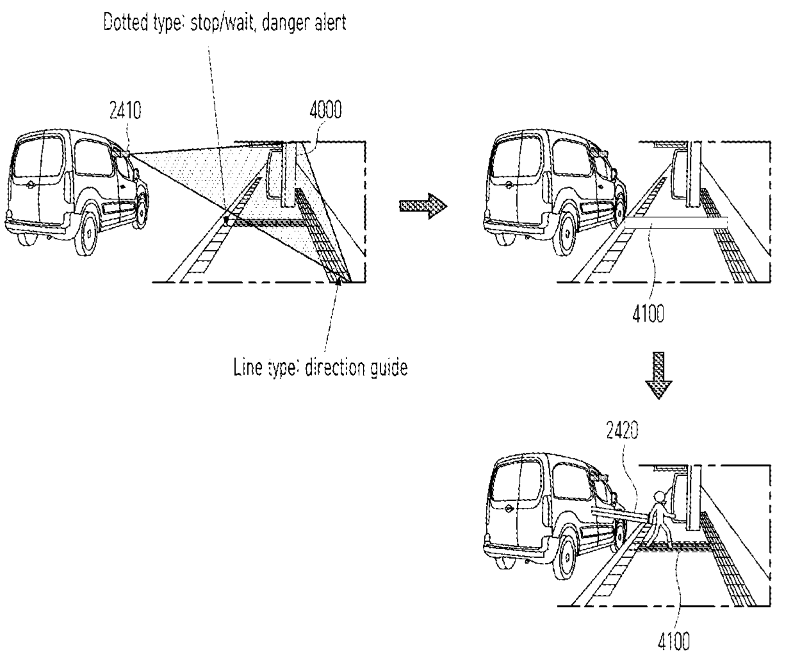
FIGS. 6 and 7 illustrate the operation of guiding a transportation vulnerable person according to some embodiments of the present disclosure.
Figure 7:
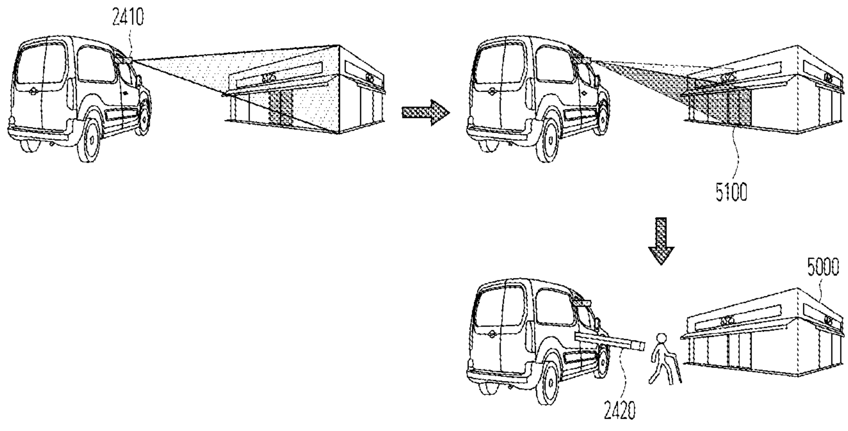

FIGS. 6 and 7 illustrate the operation of guiding a transportation vulnerable person according to some embodiments of the present disclosure.

Referring to FIG. 6, a vehicle may be driven to the vicinity of a structured destination 4000 and the camera sensor 2110 and radar sensor 2120 mounted on the front of the vehicle may be operated to determine the busyness in the vicinity and the presence and location of a braille block. The busyness in the vicinity may change depending on the number of people and obstacles near the destination.

When a braille block is present, the vehicle may determine an area where the braille block is interrupted by nearby obstacles when locating the braille block. The vehicle may distinguish between a dotted braille block and a line-type braille block. The dotted braille block may be a braille block for providing stop, wait, or danger alerts to a transportation vulnerable person. The line-type braille block may be a braille block to guide the transportation vulnerable person in a direction.

The vehicle may then stop at a point outside of the area where the braille block is interrupted by nearby obstacles.

When the transportation vulnerable person is a visually impaired person, the vehicle may open the vehicle door and the guide handle 2420 may guide the transportation vulnerable person to the braille block location 4100. The vehicle may use the camera sensor disposed at the end of the guide handle 2420 to move the guide handle 2420 to the location of the braille block 3000 to provide the transportation vulnerable person with a direction to alight from the vehicle. Additionally, the vehicle may provide a voice announcement about nearby obstacles through the speaker if necessary.

The vehicle may be associated with a braille block system that is placed at a structured destination 4000. The structured destination 4000 may be a location for accessing public transportation, such as, but not limited to, a bus stop or a subway station.

For example, in a case where the vehicle is connected to a braille block system at a bus stop, the vehicle may guide the transportation vulnerable person to the braille block using the guide handle 2420. Then, when the transportation vulnerable person is standing on the braille block, the braille block system at the bus stop may determine the transportation vulnerable person using algorithms for pattern analysis/image analysis, etc. through a camera sensor at the bus stop. Then, the braille block system at the bus stop may provide bus stop and direction information through the speaker if the transportation vulnerable person is not wearing earphones.

If the transportation vulnerable person is not wearing earphones and there are no speakers around the bus stop, the braille block system at the bus stop may provide the bus stop and direction information on a mobile phone.

If the transportation vulnerable person is wearing earphones, the braille block system at the bus stop may provide the bus stop and direction information to the earphones through communication with the mobile phone. In this case, the transportation vulnerable person's mobile phone and earphones may operate as a pair.

For example, in a case where the vehicle is connected to a braille block system in a subway station, when a transportation vulnerable person stands on the braille block, the braille block system in the subway station may determine the transportation vulnerable person using algorithms for pattern analysis/image analysis, etc. through a camera sensor in the subway station.

Then, the braille block system in the subway station may provide the transportation vulnerable person with the information about the current station and the next station, and the upstream/downstream destination information through a speaker, a mobile phone, and earphones.

Referring to FIG. 7, a vehicle moves toward an unstructured destination 5000, where the camera sensor 2410 and radar sensor 2420 mounted on the front of the vehicle may be operated to determine a business name of the specific destination and a door location 5100. The vehicle may identify nearby business names based on location information from GPS and information from the navigation system.

When there is a braille block near the destination, the vehicle may guide the person to the corresponding location. For example, when there is a braille block within 50 cm from the destination, the vehicle may guide the person to the corresponding location. However, if the braille block near the destination is beyond a certain distance (50 centimeters) from the destination, the vehicle may disregard the braille block and guide the person toward the destination.

When the vehicle stops at the specific destination 5000, the vehicle may use the camera sensors to re-identify the specific destination 5000 at the stop location to identify the signboard, business name in the building, door location, and the like. The vehicle may set a drop-off point based on the location information from the GPS and the information from the navigation system.

For example, when a nearby braille block is within 50 cm from the drop-off point at the specific destination 5000, the vehicle may move the guide handle 2420 to the location of the specific destination 5000. On the other hand, when the nearby braille block is not within 50 cm from the drop-off point of the specific destination 5000, the vehicle may move the guide handle 2420 toward the entrance of the specific destination 5000.

For example, when the guide handle 2420 of the vehicle is operated, the assistive function of announcing a corresponding business name and location may operate using a speaker at the end of the guide handle 2420.

As the door opens, the vehicle may use the guide handle 2420 to guide the person to the location of a braille block if the person is visually impaired. The vehicle may use the camera sensor disposed at the end of the guide handle 2420 to move the guide handle 2420 to the location of the braille block to provide the transportation vulnerable person with a direction to alight from the vehicle. Additionally, the vehicle may provide a voice announcement about nearby obstacles through the speaker if necessary.

The vehicle may be associated with a braille block system that is placed at the specific destination 5000. Here, the specific destination 5000 may be a place that has a braille block in the vicinity.

For example, in a case where the vehicle is associated with a braille block system at the specific destination 5000, the braille block system at the specific destination 5000 may determine the transportation vulnerable person using algorithms for pattern analysis/image analysis, etc. through the camera sensor.

The braille block system at the specific destination 5000 may then provide the transportation vulnerable person with notification of surrounding information and destination direction information via a mobile phone and earphones.

Figure 8:
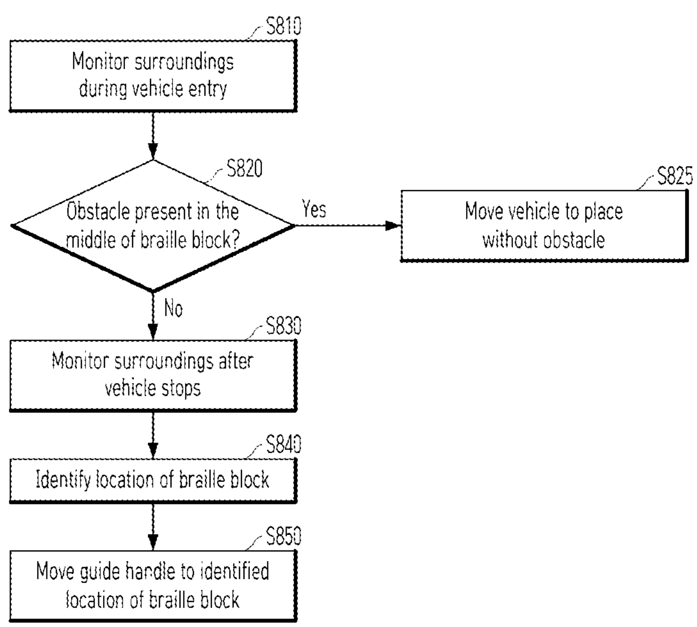
FIG. 8 is a flowchart illustrating a method of guiding a transportation vulnerable person at a structured destination according to some embodiments of the present disclosure.

FIG. 8 is a flowchart illustrating a method of guiding a transportation vulnerable person at a structured destination according to some embodiments of the present disclosure.

Referring to FIG. 8, the transportation vulnerable guidance apparatus 2000 of the present disclosure may monitor the surroundings using the camera sensor 2110 and the radar sensor 2120 during vehicle entry (S810). The transportation vulnerable guidance apparatus may collect information such as busyness at the expected arrival point and information on the location of a braille block.

After step S810, the transportation vulnerable guidance apparatus 2000 may determine if an obstacle is present in the middle of the braille block (S820).

After step S820, when there is an obstacle in the middle of the braille block (Yes in S820), the transportation vulnerable guidance apparatus 2000 may monitor the surroundings and control the vehicle to move to a place where there is no obstacle (S825).

On the other hand, after step S820, when there is no obstacle in the middle of the braille block (No in S820), the transportation vulnerable guidance apparatus 2000 may monitor the surroundings using the side camera sensor 2110 and the radar sensor 2120 after the vehicle stops (S830).

After step S830, the transportation vulnerable guidance apparatus 2000 may identify the location of the braille block at the location where the vehicle is stopped (S840).

After step S840, the transportation vulnerable guidance apparatus 2000 may move the guide handle 2420 to the identified location of the braille block as the vehicle door opens (S850).

Figure 9:
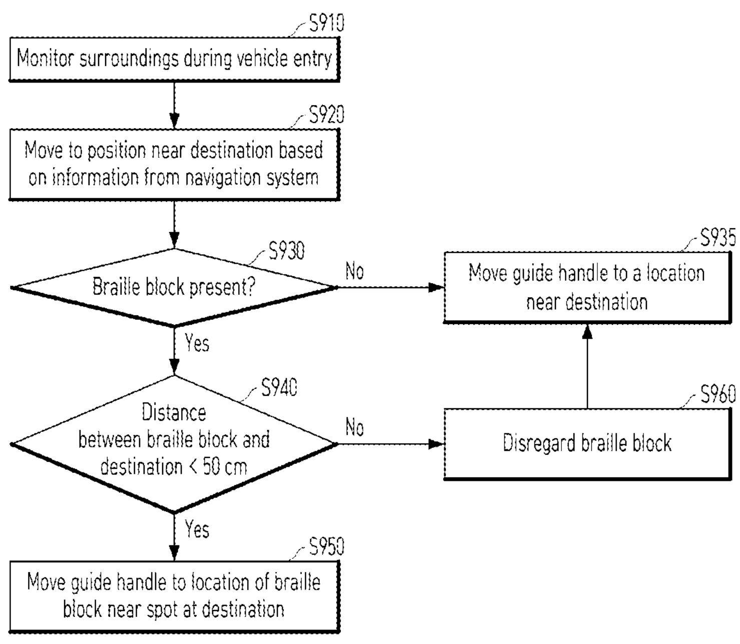
FIG. 9 is a flowchart illustrating a method of guiding a transportation vulnerable person at an unstructured destination according to some embodiments of the present disclosure.

FIG. 9 is a flowchart illustrating a method of guiding a transportation vulnerable person at an unstructured destination according to some embodiments of the present disclosure.

Referring to FIG. 9, the transportation vulnerable guidance apparatus 2000 of the present disclosure may monitor the surroundings using the camera sensor 2110 and the radar sensor 2120 during a vehicle entry (S910). The transportation vulnerable guidance apparatus 2000 may collect information such as busyness at the expected arrival point, a business name, a door location, and the presence or absence of a braille block.

After step S910, when the vehicle moves to a position near the destination based on the information from the navigation system (S920), the transportation vulnerable guidance apparatus 2000 may determine whether the destination has a braille block (S930).

After step S930, when the destination does not have a braille block (No in S930), the transportation vulnerable guidance apparatus 2000 may move the guide handle to a location near the destination drop-off point and provide a notification (S935).

After step S930, when the destination has a braille block (Yes in S930), the transportation vulnerable guidance apparatus 2000 may determine whether the distance between the braille block and the drop-off point at the destination is less than 50 cm (S940).

After step S940, when the distance between the braille block and the drop-off point at the destination is less than 50 cm (Yes in S940), the transportation vulnerable guidance apparatus 2000 may move the guidance handle to a location of the braille block near the drop-off point at the destination and provide a notification (S950).

On the other hand, after step S940, when the distance between the braille block and the drop-off point at the destination is not less than 50 cm (No in S940), the transportation vulnerable guidance apparatus 2000 may disregard the braille block (S960). The transportation vulnerable guidance apparatus 2000 may then move the guide handle to a location near the drop-off point at the destination and provide a notification.

Figure 10:
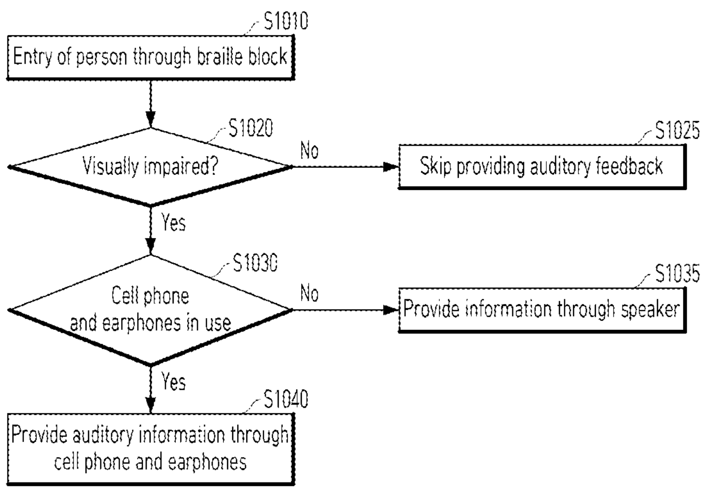
FIG. 10 is a flowchart illustrating a method of operating a braille block system according to some embodiments of the present disclosure.

FIG. 10 is a flowchart illustrating a method of operating a braille block system according to some embodiments of the present disclosure.

Referring to FIG. 10, the braille block system may detect the entry of a person through the braille block 3000 (S1010). The braille block system may detect the entry of a person using the gyro sensor 3200 and the weight sensor 3100.

After step S1010, the braille block system may determine whether the detected person is visually impaired (S1020).

After step S1020, when the detected person is not visually impaired (No in S1020), the braille block system may not provide auditory feedback to the detected person (S1025).

On the other hand, after step S1020, when the detected person is visually impaired (Yes in S1020), the braille block system may determine whether the visually impaired person is using a cell phone and earphones (S1030).

After step S1030, when the visually impaired person is not using any of the cell phone and earphones (No in S1030), the braille block system may provide information to the visually impaired person through a speaker.

On the other hand, after step S1030, when the visually impaired person is using the cell phone and earphones (Yes in S1030), the braille block system may provide the auditory information through the cell phone and earphones (S1040).

Figure 11:
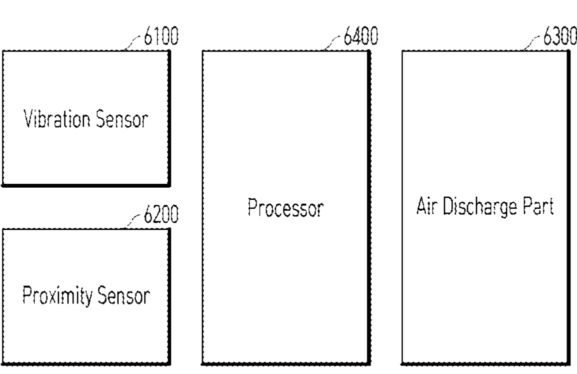
FIG. 11 is a block diagram illustrating a vehicle door handle guidance apparatus according to one of embodiments of the present disclosure.

FIG. 11 is a block diagram illustrating a vehicle door handle guidance apparatus according to one of embodiments of the present disclosure.

Referring to FIG. 11, a vehicle door handle guidance apparatus 6000 may include a vibration sensor 6100, a proximity sensor 6200, an air discharge part 6300, and a processor 6400.

When a person puts his or her hand to find a handle within a 30 cm radius around an exterior door handle of the vehicle, the vibration sensor 6100 may guide the person to the handle area using tactile feedback through vibration. When the person puts his or her hand to find a handle within a 20 cm radius around the interior door handle of the vehicle, the vibration sensor 6100 may guide the person to the handle area using tactile feedback through vibration.

The proximity sensor 6200 is provided to recognize objects around the vehicle door handle and may detect whether a hand is within a 30 cm radius around the exterior door handle of the vehicle to find the exterior door handle. The proximity sensor 6200 may detect whether a hand is within a 20 cm radius around the vehicle interior door handle to find the interior door handle of the vehicle.

The air discharge part 6300 may be disposed in the handle in the form of a hole for discharging air.

For example, the air discharge part 6300 may have ten discharge portions disposed horizontally to discharge air in chronological order. Discharge of air through the air discharge part 6300 from the left to the right side of the vehicle door handle may be an air flow pattern corresponding to a rightward opening of the handle.

The processor 6400 may control at least one of the vibration sensor 6100, the proximity sensor 6200, and the air discharge part 6300, which are provided to help the transportation vulnerable persons find the vehicle door handle. Here, the transportation vulnerable persons may be persons who feel uncomfortable when using a transportation vehicle or walking on a roadway. For example, the transportation vulnerable persons may include persons with physical disabilities, pregnant women, infants, children and adolescents, and the elderly. The persons with physical disabilities may include the visually impaired and the hearing impaired. The transportation vulnerable persons may further include, but are not limited to, stroller companions and wheelchair occupants.

When a transportation vulnerable person's hand approaches a vehicle door handle, the processor 6400 may determine a handle guidance step based on a distance between the vehicle door handle and the transportation vulnerable person's hand.

When the transportation vulnerable person's hand approaches a vehicle exterior door handle, the processor 6400 may determine whether the distance between the vehicle exterior door handle and the transportation vulnerable person's hand is within a first distance.

The processor 6400 provides directional information through the vibration. Then, when the transportation vulnerable person fails to find the handle, the processor 6400 may determine whether the distance between the vehicle exterior door handle and the transportation vulnerable person's hand is within a second distance.

When the transportation vulnerable person's hand approaches the vehicle interior door handle, the processor 6400 may determine whether the distance between the vehicle exterior door handle and the transportation vulnerable person's hand is within a third distance.

The processor 6400 may provide a guidance notification based on the determined handle guidance step.

When the distance between the vehicle exterior door handle and the transportation vulnerable person's hand is within the first distance, the processor 6400 may provide up, down, left, or right directional information indicating the location of the handle through vibration.

When the transportation vulnerable person grasps the handle after the directional information is provided through vibration, the processor 6400 may control the air discharge part 6300 to discharge air with a direction and pattern to indicate the direction in which the door opens.

When the distance between the vehicle exterior door handle and the transportation vulnerable person's hand is within the second distance, the processor 6400 may cause the air discharge part 6300 to discharge air to indicate the location of the handle.

When the distance between the vehicle exterior door handle and the transportation vulnerable person's hand is within the third distance, the processor 6400 may cause air to be discharged through the air discharge part 6300.

When the transportation vulnerable person grasps the handle after the processor 6400 provides directional information using the air, the processor 6400 may cause air to be discharged with a direction and pattern from the air discharge part 6300 to indicate the direction in which the door opens.

Figure 12:
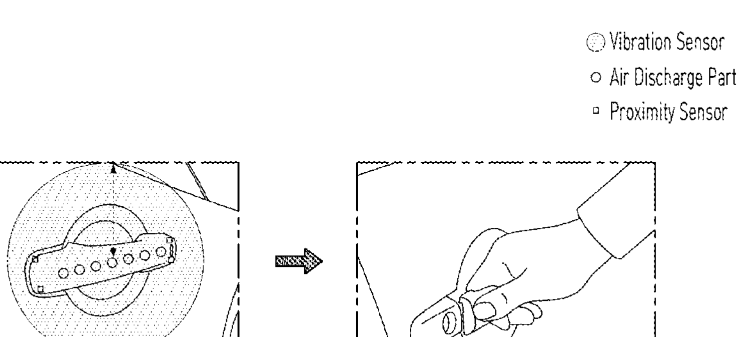
FIG. 12 illustrates the action of a transportation vulnerable person entering a vehicle according to some embodiments of the present disclosure.

FIG. 12 illustrates the action of a transportation vulnerable person entering a vehicle according to some embodiments of the present disclosure.

Referring to FIG. 12, a vehicle door handle guidance apparatus 6000 may detect that a transportation vulnerable person is approaching a region near a vehicle exterior door handle in an attempt to find the vehicle exterior door handle to enter the vehicle.

The vehicle door handle guidance apparatus 6000 may determine, using the proximity sensor 6200 in the vehicle exterior door handle, whether the transportation vulnerable person's hand is within a first radius around the handle. In this case, the first radius corresponding to the vehicle exterior door handle may be 30 cm.

When the transportation vulnerable person's hand is within the range of the first radius, the vehicle door handle guidance apparatus 6000 may provide the handle location by providing up, down, left, or right directional information through vibration.

When the hand of the transportation vulnerable person comes within a second radius around the handle after the vehicle door handle guidance apparatus 6000 provides the handle location through vibration, air may be discharged through the air discharge part 6300 in the handle to provide the handle location. In this case, the second radius corresponding to the vehicle exterior door handle may be 15 cm.

After providing the handle location by discharging air, the vehicle door handle guidance apparatus 6000 may provide a direction in which the door opens by providing a direction or pattern of air discharge before the person finds the handle and opens the door.

When a hand comes within a third radius around the handle, and is immediately detected by the proximity sensor, the vehicle door handle guidance apparatus 6000 may discharge air to indicate the handle. In this case, the third radius corresponding to the vehicle exterior door handle may be 5 cm.

Figure 13:
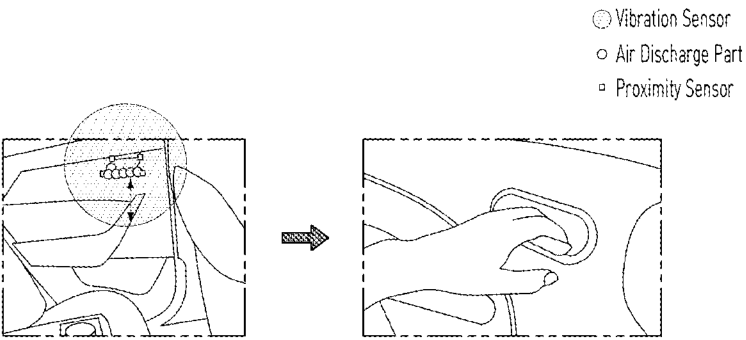
FIG. 13 illustrates the action of a transportation vulnerable person exiting a vehicle according to some embodiments of the present disclosure.

FIG. 13 illustrates the action of a transportation vulnerable person exiting a vehicle according to some embodiments of the present disclosure.

Referring to FIG. 13, the vehicle door handle guidance apparatus 6000 may detect that a transportation vulnerable person is approaching a region near a vehicle door handle in an attempt to find the vehicle door handle to alight from the vehicle.

The vehicle door handle guidance apparatus 6000 may determine, through the proximity sensor 6200 in the vehicle door handle, whether the transportation vulnerable person's hand is within a fourth radius around the handle's center. In this case, the fourth radius corresponding to the interior door handle of the vehicle may be 20 cm.

When the transportation vulnerable person's hand comes within the fourth radius, the vehicle door handle guidance apparatus 6000 may provide the handle location by providing up, down, left, or right directional information through vibration.

The vehicle door handle guidance apparatus 6000 may provide a handle location notification by discharging air through the air discharge part 6300 in the handle if the transportation vulnerable person fails to find the handle within a certain period of time.

After providing the handle location through the air discharge, the vehicle door handle guidance apparatus 6000 may provide the direction in which the door opens by providing an air discharge direction or pattern before the person finds the handle and opens the door.

Upon detecting the hand through the proximity sensor, the vehicle door handle guidance apparatus 6000 may discharge air to indicate the handle.

Figure 14:
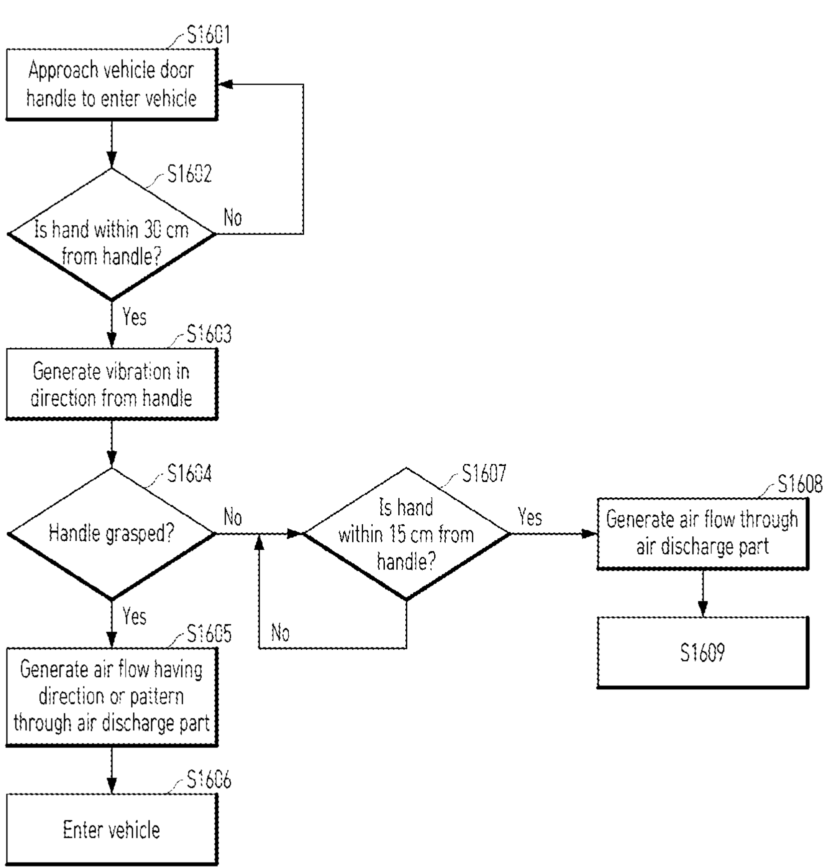
FIGS. 14 and 15 are flowcharts illustrating a method of operating a vehicle door handle guidance apparatus according to some embodiments of the present disclosure.
Figure 15:
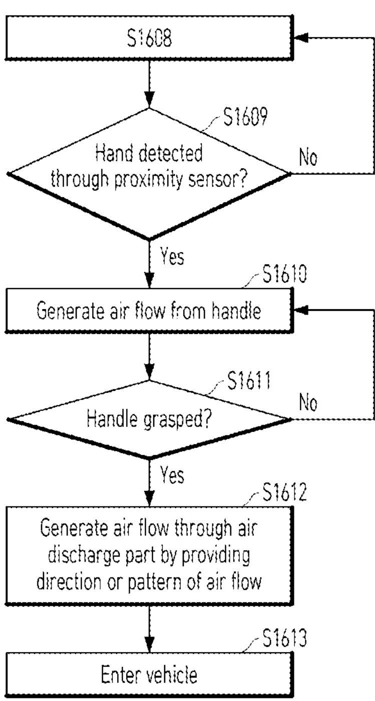

FIGS. 14 and 15 are flowcharts illustrating a method of operating a vehicle door handle guidance apparatus according to some embodiments of the present disclosure.

Referring to FIGS. 14 and 15, when a transportation vulnerable person (e.g., a visually impaired person) finds a vehicle door handle to enter a vehicle (S1601), the vehicle door handle guidance apparatus (6000) according to the present disclosure may determine whether the transportation vulnerable person's hand is within 30 cm from the handle (S1602).

After step S1602, when the transportation vulnerable person's hand is within 30 cm from the handle (Yes in S1602), the vehicle door handle guidance apparatus 6000 may provide directional information about the handle location as tactile feedback including vibration (S1603).

After step S1603, the vehicle door handle guidance apparatus 6000 may determine whether the transportation vulnerable person has grasped the handle (S1604).

After step S1604, when the transportation vulnerable person has grasped the handle (Yes in S1604), the vehicle door handle guidance apparatus 6000 may generate an air flow having a direction or pattern of the air flow through the air discharge part 6300 to indicate the direction in which the door opens (S1605).

After step S1605, when the transportation vulnerable person recognizes the handle by the generated air flow, the transportation vulnerable person may use the handle to enter the vehicle (S1606).

On the other hand, after step S1604, when the transportation vulnerable person fails to grasp the handle (No in S1604), the vehicle door handle guidance apparatus 6000 may determine whether the transportation vulnerable person's hand is within 15 cm from the handle (S1607).

After step S1607, when the transportation vulnerable person's hand is within 15 cm from the handle (Yes in S1607), the vehicle door handle guidance apparatus 6000 may generate air flow through the air discharge part 6300 to indicate the direction in which the door opens (S1608).

After step S1608, the vehicle door handle guidance apparatus 6000 may determine whether the transportation vulnerable person's hand is close to the handle using the proximity sensor 2200 (S1609).

After step S1609, when the transportation vulnerable person's hand is close to the handle (Yes in S1609), the vehicle door handle guidance apparatus 6000 may generate air flow through the air discharge part 6300 to indicate the direction in which the door opens (S1610).

After step S1610, the vehicle door handle guidance apparatus 6000 may determine whether the transportation vulnerable person has grasped the handle (S1611).

After step S1611, when the transportation vulnerable person has grasped the handle (Yes in S1611), the vehicle door handle guidance apparatus 6000 may generate air flow having a wind direction or pattern of the air flow through the air discharge part 6300 to indicate the direction in which the door opens (S1612).

After step S1612, when the transportation vulnerable person recognizes the handle by the generated air flow, the transportation vulnerable person may use the handle to enter the vehicle (S1613).

In other words, the technical ideas of the present disclosure are applicable to an autonomous vehicle as a whole, or to some components in the autonomous vehicle. The scope of the present disclosure is to be determined based on the appended claims.

In another aspect of the present disclosure, the above-described proposals or operations of the disclosure may be provided in the form of code that can be implemented, performed, or executed by a "computer" (a broad concept that includes a system on chip (SoC) or microprocessor, etc.), or an application, computer-readable storage medium, or computer program product storing or including the code, which is also within the scope of the present disclosure.

A detailed description of preferred embodiments of the disclosure has been provided above to enable those skilled in the art to implement and practice the disclosure. Although the disclosure has been described above with reference to preferred embodiments of the disclosure, it will be understood by those skilled in the art that various modifications and changes can be made to the disclosure without departing from the scope of the disclosure. For example, those skilled in the art may utilize each of the configurations described in the above-described embodiments by combining them with each other.

Accordingly, the disclosure is not intended to be limited to the embodiments described herein, but rather to provide the broadest possible scope consistent with the principles and novel features disclosed herein.

What is claimed is:

1. A method of guiding a transportation vulnerable person, the method comprising:

in response to a vehicle entering a destination, monitoring surroundings of the destination using a sensor system of the vehicle;

determining a drop-off point at the destination based on sensor information from the monitoring; and controlling movement of a guide handle of the vehicle to move to an outside of the vehicle by controlling a position and a direction of the guide handle to move an end of the guide handle to the determined drop-off point, wherein the guide handle is provided to the transportation vulnerable person to move to the determined drop-off point, the guide handle includes one or more sensors-a camera to detect the position and the direction of the guide handle, in the guide handle, includes a speaker that provides a notification about the surroundings of the destination.

2. The method of claim 1, wherein in response to a vehicle entering a destination, monitoring the surroundings of the destination comprises:

when the destination is a structured destination, collecting information about at least one of busyness at the destination or braille block location information, wherein the structured destination is a location for accessing public transportation including a bus stop or a subway station.

3. The method of claim 2, wherein the determining the drop-off point at the destination based on the information from the monitoring comprises:

determining whether an obstacle is present on a braille block at the destination; and in response to a determination that the obstacle is not present, determining that the vehicle stops at the drop-off point.

4. The method of claim 3, wherein the controlling movement of the guide handle to move to the outside of the vehicle comprises:

identifying a location of the braille block at the drop-off point; and controlling the guide handle to move to the outside of the vehicle at the identified location of the braille block.

5. The method of claim 1, wherein the vehicle entering the destination and monitoring the surroundings of the destination comprises:

when the destination is an unstructured destination, collecting information about at least one of busyness at an expected arrival point, a business name, or a door location, wherein the unstructured destination is a location other than a structured destination indicating a location for accessing public transportation.

6. The method of claim 5, wherein the determining the drop-off point at the destination based on the information from the monitoring comprises:

determining whether the destination has a braille block as the unstructured destination.

7. The method of claim 6, further comprising:

in response to a determination that the destination has the braille block, determining whether a distance between the braille block and the drop-off point is within a predetermined distance.

8. The method of claim 7, wherein the controlling movement of the guide handle to move to the outside of the vehicle comprises:

in response to a determination that the distance between the braille block and the drop-off point is within the predetermined distance, identifying a location of the braille block at the drop-off point; and controlling the guide handle to move to the outside of the vehicle toward the identified location of the braille block.

9. The method of claim 7, wherein the controlling movement of the guide handle to move to the outside of the vehicle further comprises:

in response to a determination that the distance between the braille block and the drop-off point is not within the predetermined distance, disregarding the braille block at the drop-off point; and controlling the guide handle to move to the outside of the vehicle toward the determined drop-off point.

* * * * *